United States Patent [19]

Cook

[11] 4,106,343

[45] Aug. 15, 1978

[54] SOLID STATE BAROMETRIC ALTIMETER-ENCODER

[75] Inventor: Harry Cook, Neptune, N.J.

[73] Assignee: The United States of America as represented by the Secretary of the Army, Washington, D.C.

[21] Appl. No.: 801,937

[22] Filed: May 31, 1977

[51] Int. Cl.² ............................................. G01L 7/14
[52] U.S. Cl. .................................................. 73/387
[58] Field of Search ....................... 73/384, 387, 386; 235/151.32, 150.2; 340/27 NA, 347 NT

[56] References Cited

U.S. PATENT DOCUMENTS

| 2,922,990 | 1/1960 | Anderson | 346/34 |
| 2,987,704 | 6/1961 | Gimpel et al. | 340/172.5 |
| 3,701,145 | 10/1972 | Bergin | 340/347 NT |
| 3,824,585 | 7/1974 | Meiuer | 340/347 NT |
| 3,837,224 | 9/1974 | Ream | 235/151.3 |
| 3,839,626 | 10/1974 | Klem | 235/151.3 |
| 3,889,104 | 6/1975 | Smith | 235/150.2 |
| 3,939,459 | 2/1976 | Hoopes | 340/347 NT |

Primary Examiner—Anthony V. Ciarlante
Attorney, Agent, or Firm—Nathan Edelberg; Sheldon Kanars; Bernard Franz

[57] ABSTRACT

A solid-state barometric altimeter-encoder. The atmospheric pressure is compared to a reference vacuum on a hybrid IC pressure transducer which generates a proportional signal. This analog signal is then converted into digital data, corrected for atmospheric to altitude non-linearity by use of a ROM look-up table, displayed as a digital readout and also converted to Grey code format for transponder MC (altitude) transmission.

4 Claims, 5 Drawing Figures

SOLID STATE BAROMETRIC ALTIMETER-ENCODER

GOVERNMENT LICENSE

The invention described herein may be manufactured and used by or for the Government, for governmental purposes, without the payment of any royalties thereon or therefor.

BACKGROUND OF THE INVENTION (1) Field of the Invention

Broadly speaking, this invention relates to barometric altimeters. More particularly, in a preferred embodiment, this invention relates to a barometric altimeter employing a solid-state, integrated circuit pressure transducer.

(2) Discussion of the Prior Art

Existing mechanical altimeters are expensive to manufacture and need frequent calibration which involves many critical adjustments. Thus, the recent development of a solid-state integrated circuit pressure transducer has spurred the search for a practical solid-state barometric altimeter for use in civil and military aircraft, radiosonde weather balloons, and the like. Such a solid-state altimeter would possess significant advantages over existing mechanical designs because IC transducers are highly accurate, temperature compensated and readily field replaceable.

SUMMARY OF THE INVENTION

Fortunately, the search for a practical solid-state altimeter design has been solved by the instant invention which, in a preferred embodiment, comprises means for generating an analog voltage signal which is proportional to the applied atmospheric pressure, means for converting the proportional analog voltage signal into a corresponding digital signal, memory means including a look-up table for translating the proportional digital signal into a digital signal which is representative of the corresponding altitude, and means for visual display and airborne transponder transmission of the digital altitude signal.

The invention and its mode of operation will be more fully understood from the following detailed description, when taken with the appended drawings, in which:

DETAILED DESCRIPTION OF THE INVENTION

Figure 1:
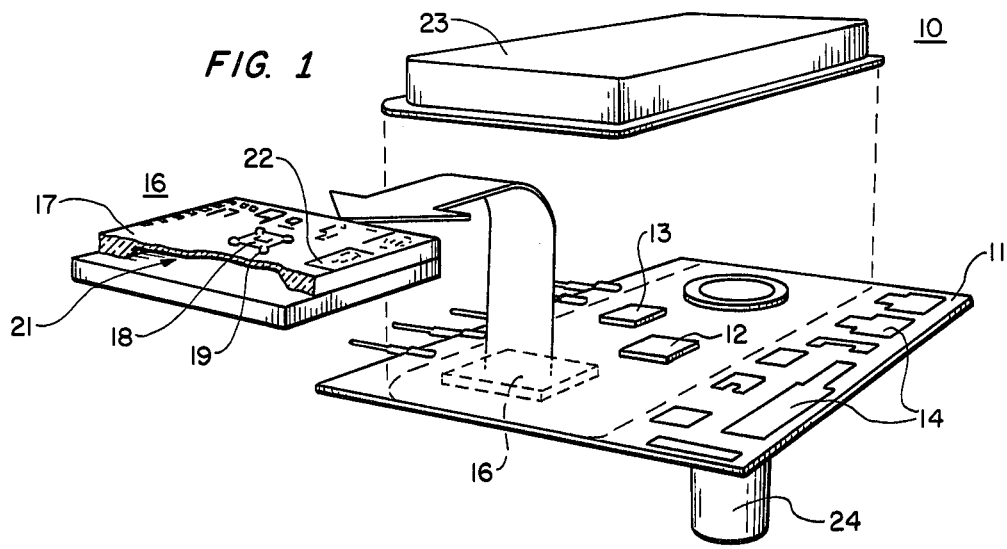
FIG. 1 is an exploded, isometric view of a typical integrated circuit transducer.

FIG. 1 depicts an illustrative IC transducer 10. As shown, transducer 10 comprises a ceramic substrate 11 supporting a pair of operational amplifiers 12 and 13, a plurality of thick-film signal processing resistors 14 and a pressure sensor 16. Pressure sensor 16 is fabricated on a silicon diaphragm 17 and includes a temperature sensor 18, piezo-resistive strain sensors 19 to sense the deflection of diaphragm 17, a vacuum reference 21 and signal discrimination and conditioning circuits 22. The overall assembly is sealed in by a cover 23; however, a pressure tube connection 24, which passes through substrate 11, admits the atmosphere whose pressure is to be measured.

The operating range for a typical hybrid IC pressure transducer, such as shown in FIG. 1, is from approximately zero to one standard atmosphere over a temperature range of from −40° F to +240° F with a capability to three atmospheres. The useful range for most civil and military aeronautical applications is from 1.0367 to 0.238 atmospheres (approximately −1,000 feet to +35,000 feet in altitude).

In operation, tube connection 24 supplies the external pressure source which is applied to and compared with the chip reference vacuum at its cavity membrane. The membrane converts the resultant pressure value to a strain function which varies the piezo-resistive bridge elements 19 diffused on the chip membrane. Voltage applied across the varying bridge results in a variable output signal that is linearly proportional to the externally applied pressure. (The construction of the reference pressure cavity is immune to internal temperature changes.) The electrical signal is fed to dual op amps 22 (on the same hybrid substrate) which performs common mode signal discrimination and provides a single ended output signal. This signal is amplified by op amps 12 and 13 to provide a zero to 10 volt output.

Figure 2:
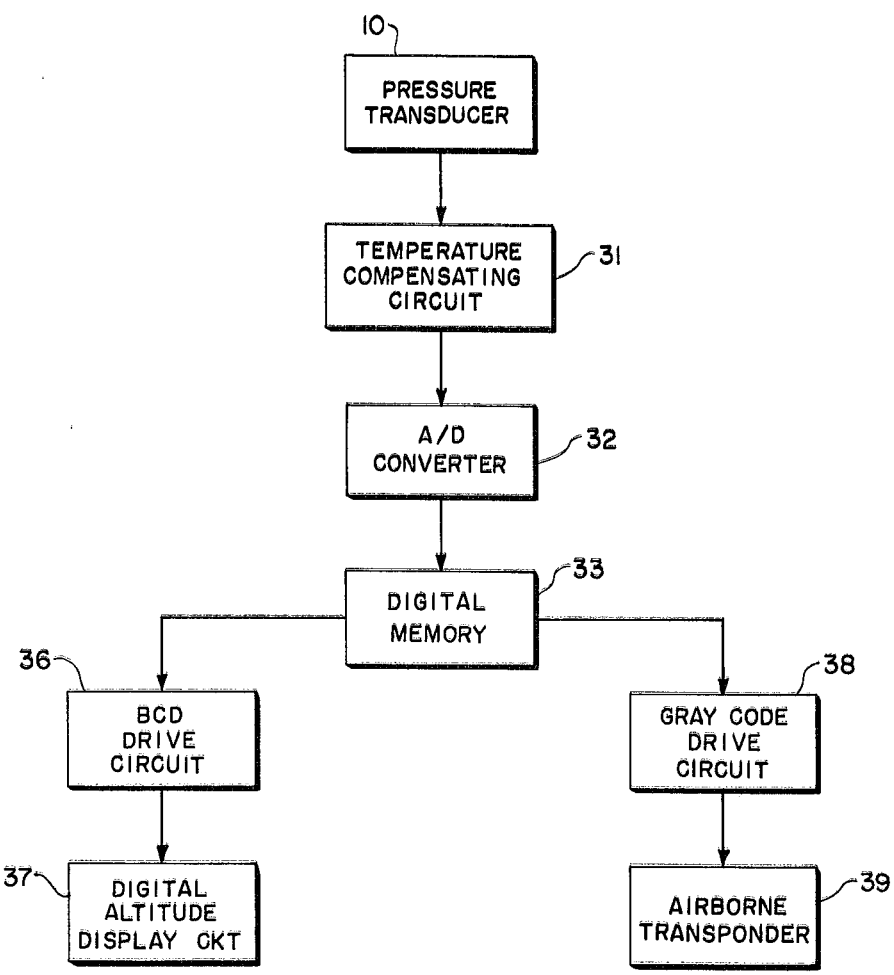
FIG. 2 is a block schematic diagram of an altimeter-encoder according to the invention which utilizes the transducer shown in FIG. 1.

FIG. 2 depicts in block diagram form one illustrative embodiment of the invention which utilizes the IC transducer shown in FIG. 1. As shown, the output of transducer 10 is connected to a temperature compensating circuit 31, thence to an A/D converter 32 (12-bit in the illustrative example) and a digital memory 33.

Memory 33 acts as a translator and by means of a look-up table converts the binary encoded altitude data into BCD encoded data and Grey code data. The BCD data is applied to a drive circuit 36 which drives a digital display circuit 37. The Grey encoded data is fed to a second drive circuit 38, thence to an airborne transponder 39.

Figure 3:
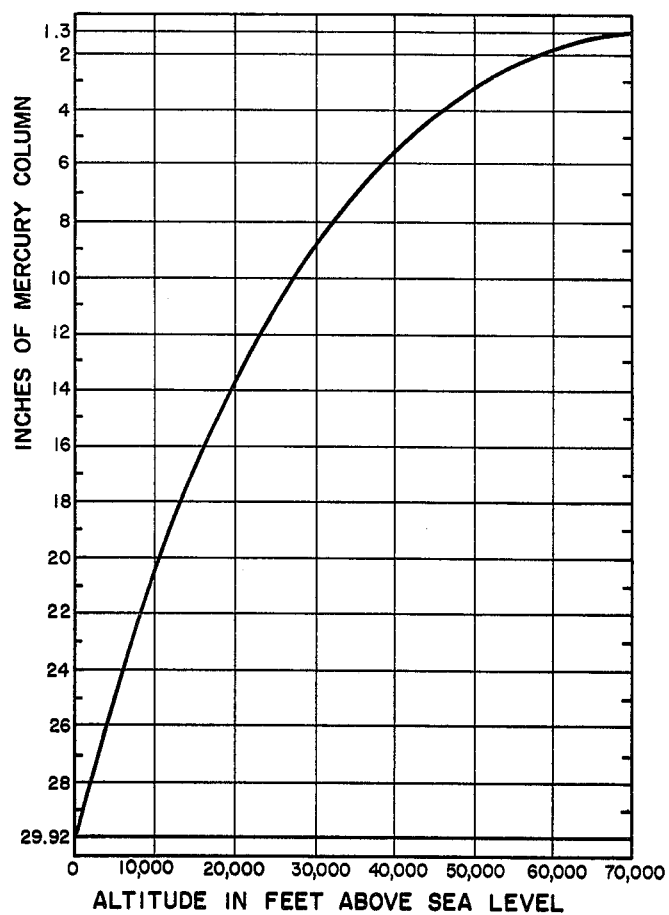
FIG. 3 is a graph showing the non-linear relationship between barometric pressure and altitude.

As previously mentioned, a 12-bit A-to-D converter was selected to interface with the pressure transducer. This converter provides a 12-bit binary output signal for the zero to ten volt output range of the transducer. If the design performance of the pressure transducer is altered to compensate for the non-linear characteristics of the atmospheric pressure to altitude curve shown in FIG. 3, then the A-to-D converter with BCD output 32 could directly drive the decimal display readout with the altitude data. However, the non-linear atmospheric pressure to altitude curve (FIG. 3) requires a compensating stage to linearize the inherent curvature. A ROM circuit corrects for the non-linear phenomena and also provides the binary-to-BCD conversion to drive the numeric displays. The numeric display unit converts the ROM/BCD output to the required decimal readout of altitude data. "BCD to Grey Code" translation of the corrected altitude data format, needed to activate the transponder for an altitude reporting capability, is provided by a similar ROM look-up table operation.

A digital adder/subtractor IC chip, controlled by a BCD digiswitch (or equivalent) may be used to provide the circuitry with the necessary Baroset control.

The electronic altimeter shown in FIG. 2 will eliminate the need for a vibrator circuit since the unit is inherently free of mechanical friction. Furthermore, the design will allow the altimeter to withstand vibration environments well beyond the 2g limitation of mechanical altimeters. (Actually the altimeter will probably do better than 10g, depending on the construction of the housing.) The electronic altimeter may also resist environmental factors such as temperature, fungus, humidity, sand, et cetera, better than mechanical altimeters because of hermetic component packaging proposed. The electronic altimeter should also provide tolerances to 10 foot altitudes (and better if required) which is not possible with mechanical altimeters. (To generate 5 foot tolerances would require 7200 data bits to a 35K altitude. That would require an A/D converter capability of $2^{13}$ bits and probably an added op-amp stage to expand the pressure transducer output to maintain system resolution.)

The suggested design parameters for the solid-state altimeter disclosed herein proposes readouts of 10 foot altitude increments from $-1K$ to $+5K$ feet, 20 foot increments from 5K to 10K feet, and 50 foot increments from 10K to 35K feet. By incorporating a 12-bit A/D converter in the system, $2^{12}$ (or 4096) information bits are realized, which exceeds the design goal specified above.

Generating 10 foot increments from $-1K$ to $+35K$ feet requires 3600 data bits; thus, the 12-bit A/D converter employed clearly has the range capability desired. However, two or more ROM chips are required to provide the accuracy for 10 foot increment range of data bits for altitude readout.

The electronic altimeter-encoder may also be readily interfaced with other digital or analog components to provide additional information such as altitude alerting guard lanes, rate of climb or descent, et cetera. By simply tying the pressure transducer output to op amp comparators one provides the altitude alerting capability. Feeding the BCD altitude format into a digital sample-hold and comparator circuit provides the rate of climb/descent function.

Figure 5:
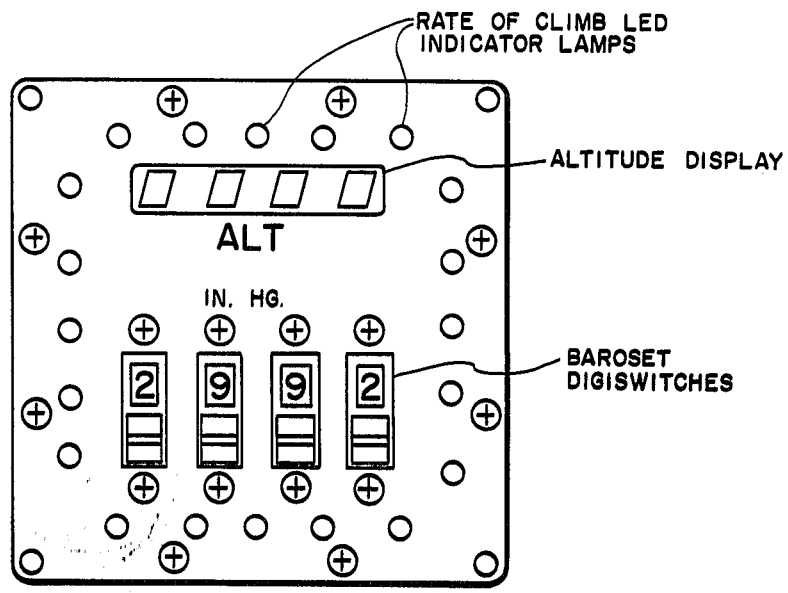
FIG. 5 is a representation of the front face of an altimeter-encoder according to FIGS. 1, 2 and 4.
Figure 4:
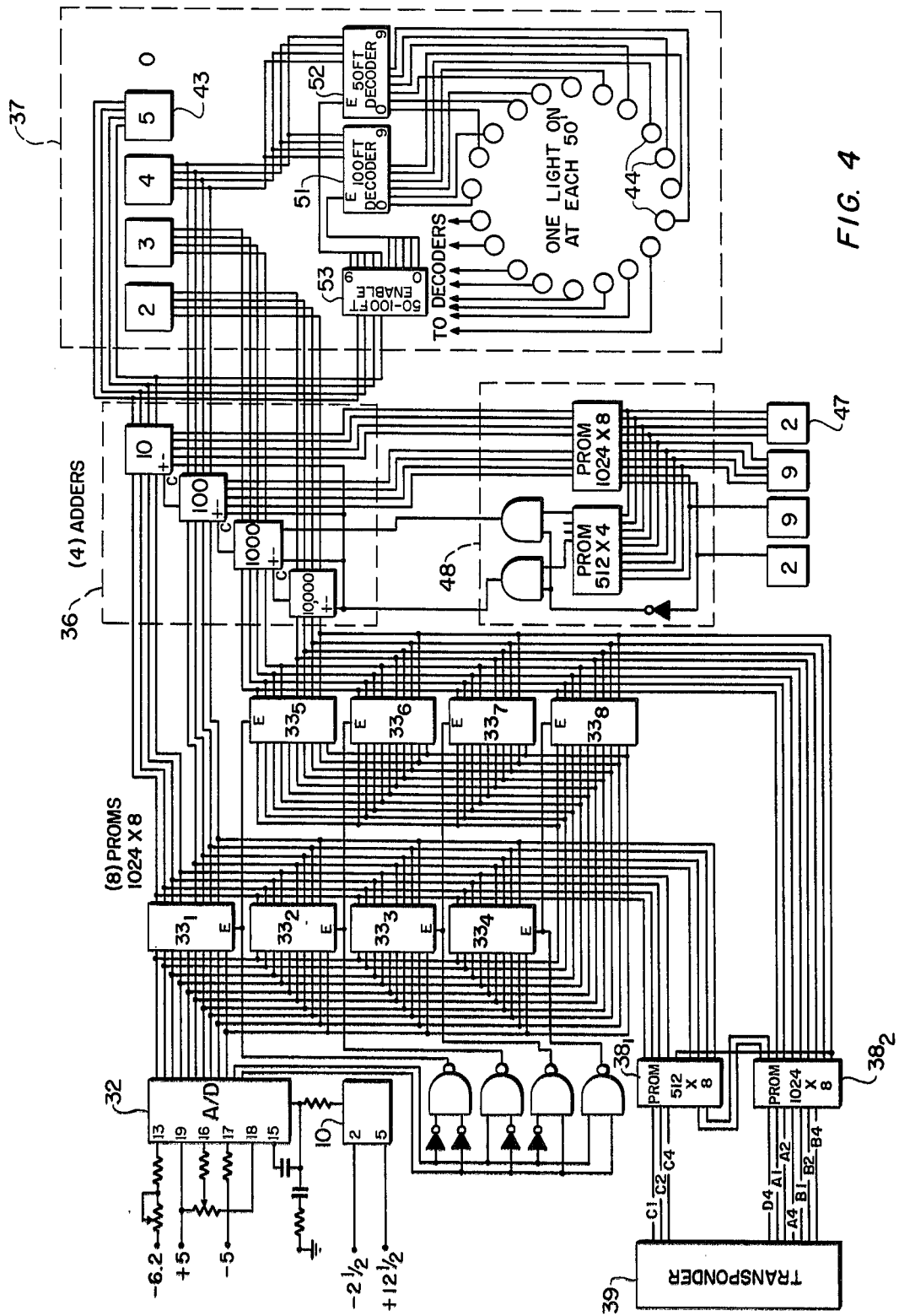
FIG. 4 is a more detailed circuit diagram of one embodiment of the altimeter-encoder circuit shown in FIG. 1.

FIG. 4 depicts an illustrative embodiment of the circuit shown in FIG. 2. It will be apparent that this circuit is substantially similar to the circuit shown in FIG. 2 except that the manually operated BCD digiswitch 47 and associated decoding circuit 48 previously mentioned is shown connected to the drive circuit 38 to provide the necessary Baroset control. It will also be noted that the display circuit 37 includes both a digital readout 43 and lamp indicators comprising a plurality of LED's 44 to display altitude data. FIG. 5 depicts the face of the altimeter-encoder, as viewed by the pilot.

In operation, and with reference to FIGS. 4 and 5, the analog signal from transducer 10 is digitized by A/D converter 32 and presented to the memory 33 as 12-bit binary information. The BCD output from the memory is corrected for the non-linear altitude-pressure curve and by the BCD adder-subtractor 38 for barometric pressure change correction before the data is presented to the LED display. Thumbwheel digiswitches 47 present pilot controlled barometric pressure data which is translated to BCD altitude change by the memory 48. The baroset display is the number on the thumbwheel switches.

Twenty small LED's 44, activated at 50 foot increments, are driven by two chips 51 and 52 which decode the 100 foot altitude data. These chips are enabled at alternate 50 foot intervals by a BCD-to-decimal decoder 53 on the 10 foot altitude data lines.

Prior to correction for barometric pressure setting, the BCD altitude data is decoded in memory and presented as the Grey code for the transponder.

The installation of a remote, temperature-controlled IC transducer at the aircraft skin, to eliminate pitot tube inaccuracies, is also proposed. In the event, voltage-to-frequency converter chips are proposed to convert the transducer analog output to digital format for transmission to minimize signal cable losses. The sensed digital data is readily inputted into microprocessor chips for multi-function operations such as look-up table correction of atmospheric pressure to altitude, and altitude conversion and translation to Grey code and decimal data. Successive altitude readouts, for a preset period, could be compared through microprocessor programming for Rate of Climb/Dive data. Hi/Lo altitude guard data, on operator keyboard instructions, could be inputted into the microprocessor for comparison to aircraft altitude to detect alert conditions. Differential IC pressure transducers installed in the aircraft's nose could possibly provide microprocessor interface data for comparison against the altitude data for air speed indicator operation.

One skilled in the art can make various changes to the combination of parts shown without departing from the spirit and scope of the invention.

What I claim is:

1. A barometric altimeter-encoder which comprises:
   pressure sensing means to electronically sense pressure and to generate an analog voltage signal which is proportional to the applied atmospheric pressure;
   analog-to-digital converter means to convert said analog voltage signal into a corresponding digital pressure signal;
   memory means including look-up table means, having address inputs, a first set of data outputs, and a second set of data outputs, with connections from the analog-to-digital converter means to said address inputs, so that for each possible value of the digital pressure signal there are output signals at the first set of data outputs in a first digital code indicating altitude, and output signals at the second set of data outputs in a second digital code also indicating altitude;
   baroset digital switch means for setting a value representing the current site atmospheric pressure, baroset converter means to convert the last said value to the first digital code, arithmetic combining means with input connections from the first set of data outputs and from the baroset converter means to correct the signals from the first set of data outputs to give the true altitude above sea level;
   display means to visually display the output from said combining means;
   and a transponder having inputs from said second set of data outputs for transmitting signals representing the altitude in said second digital code to a remote receiver.

2. The altimeter-encoder according to claim 1, wherein said digital pressure signals are in straight binary code, said first digital code is binary-coded-decimal, and said second digital code is a gray code;
   wherein said pressure sensing means includes temperature compensation means, and there further being a temperature compensating circuit coupled between the output of said pressure sensing means and said analog-to-digital converter means.

3. The altimeter-encoder according to claim 1, wherein said memory means comprises a first set of read-only-memory modules connected between said address inputs and said first data outputs, and a second set of read-only-memory modules connected between said first data outputs and said second data outputs.

4. The altimeter-encoder according to claim 1, wherein said display means comprises a numeric display to display the current altitude, and a plurality of circumferentially disposed light-emitting diodes to generate an analog display.

* * * * *